(12) United States Patent
Junmin et al.

(10) Patent No.: US 10,103,621 B2
(45) Date of Patent: Oct. 16, 2018

(54) MULTI-STAGE SWITCHED CAPACITOR CONVERTER AND VARIABLE CONVERSION RATIO SWITCHED CAPACITOR CONVERTER

(71) Applicant: PHILIPS LIGHTING HOLDING B.V., Eindhoven (NL)

(72) Inventors: Jiang Junmin, Eindhoven (NL); Jie Fu, Eindhoven (NL); Shu Xu, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/504,706

(22) PCT Filed: Aug. 10, 2015

(86) PCT No.: PCT/EP2015/068324
§ 371 (c)(1),
(2) Date: Feb. 17, 2017

(87) PCT Pub. No.: WO2016/026724
PCT Pub. Date: Feb. 25, 2016

(65) Prior Publication Data
US 2017/0264192 A1 Sep. 14, 2017

(30) Foreign Application Priority Data

Aug. 18, 2014 (CN) .................. PCT/CN2014/000777
Oct. 31, 2014 (EP) ..................................... 14191324

(51) Int. Cl.
*H02M 3/07* (2006.01)
*H05B 33/08* (2006.01)
*H02M 1/00* (2006.01)

(52) U.S. Cl.
CPC .......... *H02M 3/07* (2013.01); *H05B 33/0815* (2013.01); *H02M 2001/007* (2013.01)

(58) Field of Classification Search
CPC .... H02M 3/07; H02M 1/00; H02M 2001/008; H02M 2007/4835; H02J 1/102; H02J 1/10; H02J 9/00; H02J 9/005; Y10T 307/406
See application file for complete search history.

(56) References Cited

U.S. PATENT DOCUMENTS 5,414,614 A 5/1995 Fette et al.
5,581,454 A 12/1996 Collins

FOREIGN PATENT DOCUMENTS

JP 2000069745 A 3/2000
JP 2008238928 A 4/2010
(Continued)

OTHER PUBLICATIONS

Suyoung Bang et al, "A Fully Integrated Successive-Approximation Switched-Capacitor DC-DC Converter with 31mV Output Voltage Resolution", Univ. of Michigan, Ann Arbor, MI.
(Continued)

*Primary Examiner* — Yemane Mehari
(74) *Attorney, Agent, or Firm* — Akarsh P. Belagodu (57) ABSTRACT

A system comprising: a switched capacitor circuit comprising a plurality of voltage divider circuit stages including a first voltage divider circuit stage coupled to a second voltage divider circuit stage; and a controller configured to supply a clock signal to the first voltage divider circuit stage to provide a first voltage on an output node of the first voltage divider circuit stage during a first half cycle of the clock signal, and a second voltage on said output node during a second half cycle of the clock signal. The second voltage divider circuit stage is configured to charge to an input voltage during a half cycle of the clock signal, and the
(Continued)

controller is configured to synchronize charging of the second voltage divider circuit stage to a selected one of (i) the first half cycle of the clock signal, wherein the first voltage is supplied as said input voltage, and (ii) the second half cycle of the clock signal, wherein the second voltage is supplied as said input voltage.

20 Claims, 8 Drawing Sheets

(56) References Cited

FOREIGN PATENT DOCUMENTS

| JP | 2010074929 A | 4/2010 |
|---|---|---|
| JP | 2013027073 A | 2/2013 |
| WO | 2004049296 A1 | 6/2004 |

OTHER PUBLICATIONS

Michael Douglas Seeman, "A Design Methodology for Switched-Capacitor DC-DC Converters", Electrical Engineering and Computer Sciences University of California at Berkeley, Technical Report No. UCB/EECS-2009-78, May 21, 2009.

MULTI-STAGE SWITCHED CAPACITOR CONVERTER AND VARIABLE CONVERSION RATIO SWITCHED CAPACITOR CONVERTER

CROSS-REFERENCE TO PRIOR APPLICATIONS

This application is the U.S. National Phase application under 35 U.S.C. § 371 of International Application No. PCT/EP2015/068324, filed on Aug. 10, 2015 which claims the benefit of Chinese Patent Application No. PCT/CN2014/000777, filed on Aug 18, 2014 and European Patent Application No. 14191324.4, filed Oct. 31, 2014. These applications are hereby incorporated by reference herein.

BACKGROUND

Since the current trend of solid state lighting (SSL) lies on modularization and integration, distributed drivers are gaining more popularity due to their flexibility, area-efficiency and low cost. A switched capacitor converter (SCC) which transfers energy only utilizing capacitors, rules out the use of inductive components, making such a converter the favoured topology as distributed drivers.

One aspect to implement distributed drivers is "driver on board", where the drivers and light source are combined together on one carrier board. The power supply of such boards varies from regulated standard voltage to an unregulated wide range voltage, which presents difficulties for drivers to maintain high performance. For instance, to be compatible with the Power over Ethernet (PoE) standard which formulates 44V-57V as the voltage range, those drivers necessitate good line regulation, thereby, can obtain high efficiency.

Consequently, as mentioned before, one key challenge of switched capacitor converter is to achieve precise output voltage under wide range of power supply, that is, good line regulation.

For a conventional switched capacitor converter, the relationship between input and output voltage can be formulated as:

$$V_O = M * V_{IN} - R_O * I_L$$

Where, $V_O$, $V_{IN}$, $R_O$, $I_L$, M are input and output voltage, equivalent output resistance, load current and conversion ratio, respectively.

For a switched capacitor DC-DC converter whose topology is fixed, voltage is converted by only one conversion ratio. At one certain conversion ratio, output voltage is proportional to the input voltage. A switched capacitor converter having only one conversion ratio has limited line regulation performance, resulting in not only low efficiency, but large output power variation. This un-regulated output voltage is unacceptable when the voltage precision is strictly demanded.

One conventional approach to get a regulated output voltage out of a switch capacitor converter is to add a feedback loop to adjust the equivalent output resistance of the circuit.

Another conventional approach is cascading multiple SCC together, operating as a multi-stage successive-approximation (SAR) converter. Each stage divides the prior voltage into two down-scaled voltage ranges. Accordingly, if two stages are cascaded, four configurable ratios are available. Thus, N stages provide $2^N$ possible ratios. Therefore, after cascaded multi-stage SAR SCC, high voltage resolution can be achieved.

SUMMARY

The inventors have recognised that although linear output voltage can be achieved through the method described above of adding a feedback loop to adjust the equivalent output resistance of the SCC circuit, when the regulated output voltage is far away from the expected voltage which is decided by the conversion ratio or the ideal voltage, the efficiency of the SCC decreases. The larger the difference between the regulated output voltage and the ideal voltage, the larger the efficiency drop. Thus, the drawback of this method is sacrificing the efficiency while regulating voltage.

The inventors have further recognised that since a linear multi-stage SAR SCC uses several stages to obtain high resolution, the large number of capacitors and switches used decreases the overall efficiency of the converter.

According to one aspect of the present disclosure there is provided a system comprising: a switched capacitor circuit comprising a plurality of voltage divider circuit stages including a first voltage divider circuit stage coupled to a second voltage divider circuit stage; and a controller configured to supply a clock signal to the first voltage divider circuit stage to provide a first voltage on an output node of the first voltage divider circuit stage during a first half cycle of the clock signal, and a second voltage on said output node during a second half cycle of the clock signal; wherein the second voltage divider circuit stage is configured to charge to an input voltage during a half cycle of the clock signal, and the controller is configured to synchronize charging of the second voltage divider circuit stage to a selected one of (i) the first half cycle of the clock signal, wherein the first voltage is supplied as said input voltage, and (ii) the second half cycle of the clock signal, wherein the second voltage is supplied as said input voltage.

In exemplary embodiments, at least one selection switch is connected between said output node and an input node of the second voltage divider circuit stage.

The controller may be configured to synchronize charging of the second voltage divider circuit to the first half cycle of the clock signal by turning on said at least one selection switch during the first half cycle of the clock signal, to supply the first voltage on said input node.

The controller may be configured to synchronize charging of the second voltage divider circuit to the second half cycle of the clock signal by turning on said at least one selection switch during the second half cycle of the clock signal, to supply the second voltage on said input node.

In exemplary embodiments, the controller is configured to detect an output parameter and based on the detected output parameter and a target output voltage, determine a conversion ratio of the switched capacitor circuit and make said selection to configure the switched capacitor circuit to provide said determined conversion ratio.

The output parameter may be an output voltage of the switched capacitor circuit.

The system may further comprise at least one light source (D) wherein the switched capacitor circuit provides an output voltage that drives said at least one light source, and the output parameter is a sense voltage across a sensing resistor indicative of current flowing through said at least one light source.

The first voltage divider circuit stage may be based on a Dickson ladder topology and configured to operate as either a divide-by-5 voltage divider or a divide-by-4 voltage divider.

In this embodiment, the first voltage divider circuit stage may comprise a plurality of switches, and the controller configured to control the first voltage divider circuit stage to operate as divide-by-5 voltage divider by supplying said clock signal to turn on a first set of said plurality of switches on during the first half cycle of the clock signal and a second set of said plurality of switches during the second half cycle of the clock signal. The controller may be configured to control the first voltage divider circuit stage to operate as divide-by-4 voltage divider by supplying said clock signal to turn on a third set of said plurality of switches on during the first half cycle of the clock signal and a fourth set of said plurality of switches during the second half cycle of the clock signal.

The first voltage divider circuit stage may be a divide-by-two voltage divider.

The second voltage divider circuit stage may be a divide-by-two voltage divider.

The second voltage divider circuit stage may be configured to operate as either (i) a divide-by-2 voltage divider (ii) a divide-by-3 voltage divider, or a (iii) divide-by-1.5 voltage divider.

The second voltage divider circuit stage may comprise a plurality of switches, and the controller may be configured to: control the second voltage divider circuit stage to operate as a divide-by-2 voltage divider by supplying said clock signal to turn on a first set of said plurality of switches on during the first half cycle of the clock signal and a second set of said plurality of switches during the second half cycle of the clock signal; control the second voltage divider circuit stage to operate as a divide-by-3 voltage divider by supplying said clock signal to turn on a third set of said plurality of switches on during the first half cycle of the clock signal and a fourth set of said plurality of switches during the second half cycle of the clock signal; and control the second voltage divider circuit stage to operate as a divide-by-1.5 voltage divider by supplying said clock signal to turn on a fifth set of said plurality of switches on during the first half cycle of the clock signal and a sixth set of said plurality of switches during the second half cycle of the clock signal.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 1A:
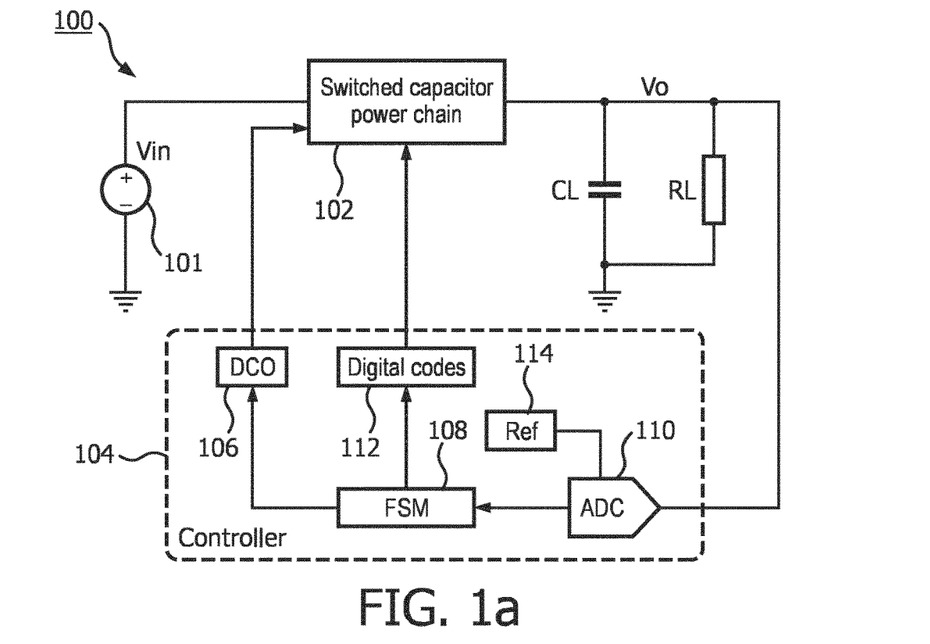
FIG. 1a illustrates a system implemented as a general purpose DC-DC converter.
Figure 1B:
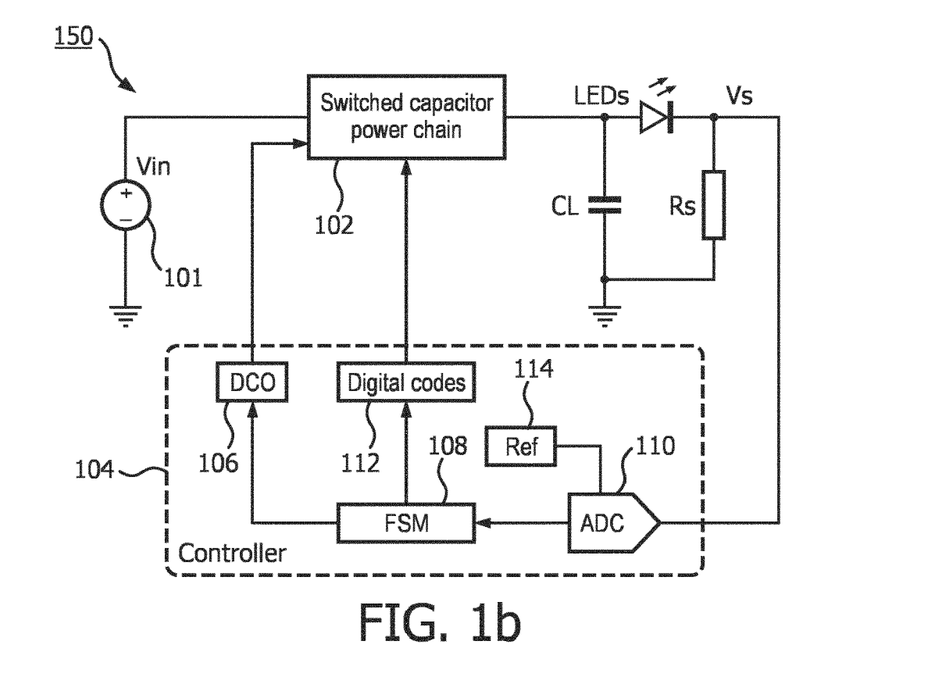
FIG. 1b illustrates the system implemented as a LED driver.

Reference is first made to FIGS. 1a and 1b which illustrates a system 100 in which the SAR SCC in accordance with embodiments described below is implemented as a general purpose DC-DC converter (FIG. 1a) and a system 150 in which the SAR SCC in accordance with embodiments described below is implemented as a Light Emitting Diode (LED) driver.

Both system 100 and 150 comprise a switched capacitor power chain 102 and a controller 104. The switched capacitor power chain 102 is supplied by an input voltage $V_{in}$ output from a power supply 101.

The controller comprises an analogue-to-digital converter (ADC) 110, a voltage reference (Ref) 114, a finite state machine (FSM) 108 which is configured to provide digital codes 112, and a digital controlled oscillator (DCO) 106.

In system 100, the output voltage is sensed in the DC-DC converter. Whilst in the system 150 the LED driver senses the current through sensing resistor Rs, keeping the LED current controllable. Whilst FIG. 1b shown the SAR SCC being used to drive a single LED (D), the LED could also be a set of LEDs, for example a string of LEDs. Whilst an LED light source is referred to herein, any suitable light source may be driven by the SAR SCC e.g. a high/low pressure gas discharge source, a laser diode, an incandescent source, or a halogen source. Whilst FIG. 1b shows the SAR SCC being used to drive an LED (D) embodiments of the present disclosure are not limited to only addressing driving of lighting loads, but also other applications, wherein size constraints similarly apply (e.g. in devices such as smart phones, laptop PCs and other portable devices, which need slim and compact electronic design).

The ADC 110 is arranged to sense an output parameter (e.g. output voltage Vo in FIG. 1a or a sense voltage Vs across the sensing resistor Rs in FIG. 1b) and convert the analogue input signal into the digital domain. The voltage reference 114 is a bias voltage for the conversion process performed by the ADC 110, and plays an important role in the sensing process as will be apparent to persons skilled in the art. The ADC 110 is configured to uniquely represent all analogue inputs within a certain range by a limited number of digital output codes. A forward feedback loop sensing input voltage can be added to improve line regulation.

The output of the ADC 110 is coupled to an input of the FSM 108. The FSM 108 is configured to receive the codes from ADC 110, determine the current status of output parameter, and output the corresponding digital codes to control selection switches in the switched capacitor power chain 102 (as will be described in more detail later). The FSM 108 may be preconfigured to control the switched capacitor power chain 102 to provide a target voltage (target output parameter). Alternatively, the FSM 108 may be configured to receive a target voltage (target output parameter) from a user, whereby this target voltage may be changed by the user in dependence on the application of the switched capacitor power chain 102.

The FSM 108 is further configured to output a control signal to the DCO 106. The functionality of the FSM 108 may be implemented in code (software) stored on a memory comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the FSM 108 is implemented in dedicated hardware circuitry, or configurable hardware circuitry like a field-programmable gate array (FPGA). Since the SAR SCC is designed for on-chip application, the FSM 108 may preferably be implemented using a digital circuit according to a Very-large-scale integration (VLSI) approach.

The DCO 106 is used to generate a switching clock signal at a desired frequency based on the control signal received from the FSM 108. The switching clock signal is used to control the switches of the switched capacitor power chain 102. In the circumstance of light load, the DCO 106 will diminish the operating frequency to improve the overall efficiency.

The structure of the switched capacitor power chain 102 shown in FIGS. 1a and 1b will now be described with reference to FIG. 2.

Figure 2:
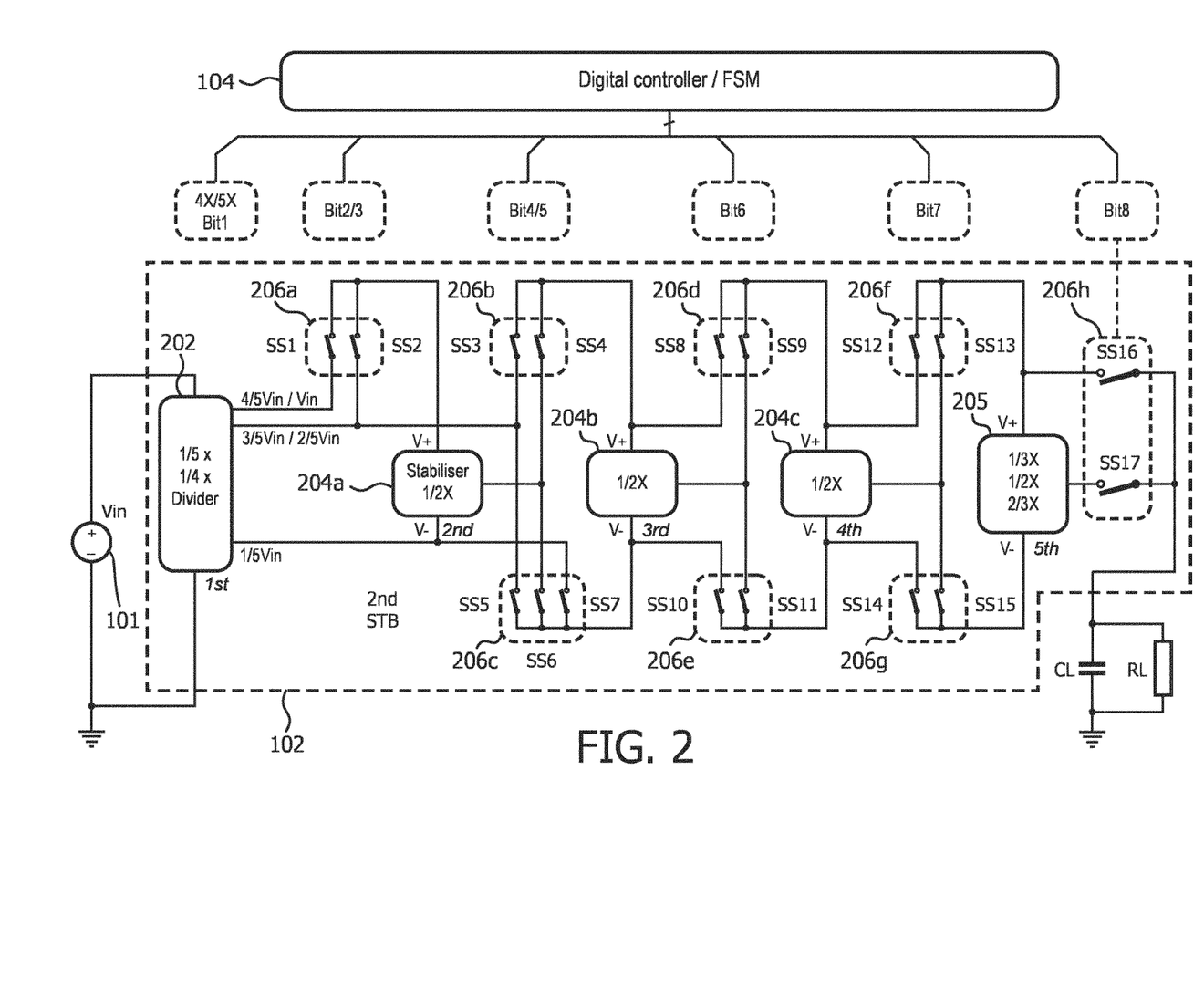
FIG. 2 shows a schematic block diagram of switched capacitor power chain.

As shown in FIG. 2, the switched capacitor power chain 102 comprises five stages.

The first SCC stage 202 has two switchable conversion ratios, that is it may operate as 4:1 voltage divider (M=0.25) or operate as a 5:1 voltage divider (M=0.2). The second SCC stage 204a is a 2:1 voltage divider (M=0.5), aiming to provide a stable voltage as a reference for the following stages. The third SCC stage 204b and the fourth SCC stage 204c are both 2:1 voltage dividers (M=0.5), scaling down the voltage region. The final fifth SCC stage 205 has three switchable conversion ratios, that is it may operate as 3:1 voltage divider, operate as 2:1 voltage divider, or operate as a 3:2 voltage divider.

Figure 3:
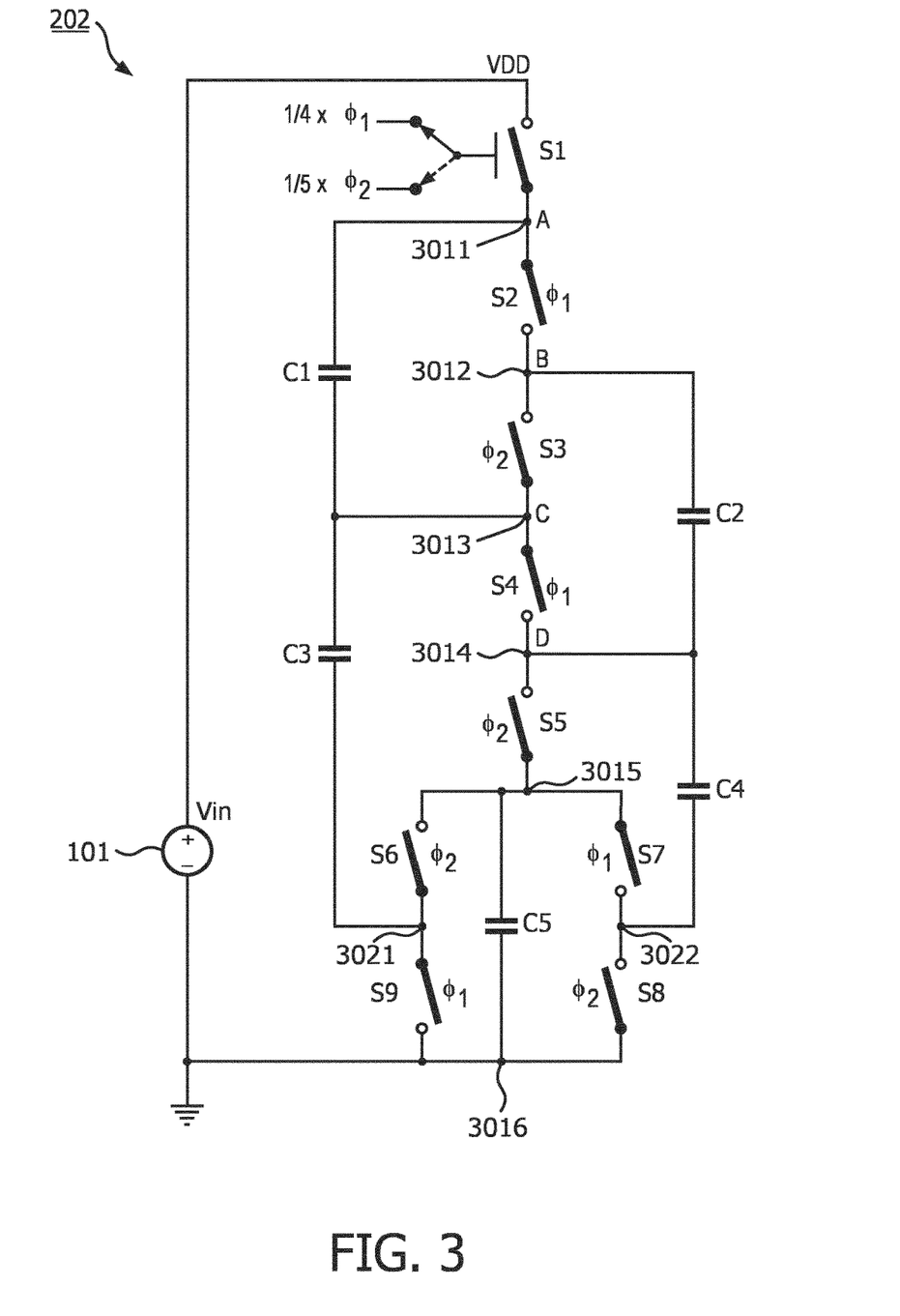
FIG. 3 illustrates a Dickson ladder circuit of a first switched capacitor converter stage of the power chain.

The first SCC stage 202 is shown in FIG. 3 and is implemented using a Dickson Ladder topology based on five capacitors C1 to C5 and nine switches S1 to S9 of the single pole, single throw type. More specifically, the first SCC stage 202 comprises two flying ladders, each flying ladder comprising two capacitors: one first flying ladder comprises a first capacitor C1 in series with a third capacitor C3, and a second flying ladder comprises a second capacitor C2 in series with a fourth capacitor C4.

The first SCC stage 202 further comprises six central nodes 3011 to 3016. A first switch S1 selectively connects the first central node 3011 (node A) to the positive terminal of the power supply 20. A second switch S2 selectively connects the first central node 3011 to the second central node 3012 (node B). A third switch S3 selectively connects the second node 3012 to the third central node 3013 (node C). A fourth switch S4 selectively connects the third central node 3013 to the fourth central node 3014 (node D). A fifth switch S5 selectively connects the fourth central node 3014 to the fifth central node 3015. A fifth loading capacitor C5 is placed between the fifth central node 3015 and a sixth central node 3016. The sixth central node 3016 is connected to the negative terminal of the power supply 20.

The first flying ladder comprising the first and third capacitors C1, C3 is located between the first central node 3011 and a first secondary node 3021. A sixth switch S6 selectively connects the first secondary node 3021 to the fifth central node 3015; a seventh switch S7 selectively connects the first secondary node 3021 to the sixth central node 3016. A node in-between first capacitor C1 and third capacitor C3 is connected to the third central node 3013.

The second flying ladder comprising the second and fourth capacitors C2, C4 is located between the second central node 3012 and a second secondary node 3022. An eighth switch S8 selectively connects the second secondary node 3022 to the fifth central node 3015; a ninth switch S9 selectively connects the second secondary node 3022 to the sixth central node 3016. A node in-between second capacitor C2 and fourth capacitor C4 is connected to the fourth central node 3014.

The two flying ladders are oppositely phased, thanks to an adequate sequence of opening and closing the switches S1 to S9.

As explained above the first SCC stage 202 may operate as 4:1 voltage divider (M=0.25) or operate as a 5:1 voltage divider (M=0.2), this is achieved by applying appropriate switching sequences to the switches S1-S9. The term "switching sequence" is used herein to refer to a first set of switches of a SCC stage being turned on during a first time phase (whilst a remaining second set switches are turned off), and the second set of switches of the SCC stage being turned on during a second time phase (whilst the first set of switches of the SCC stage are turned off).

For example, to configure the first SCC stage 202 for operation as a 5:1 voltage divider, the switching clock signal with a duty cycle D that is output from the DCO 106 is supplied to switches S1, S3, S5, S6 and S8 to control these switches to be in a given state during a first time phase $\Phi 1$, for instance turned on, and a clock signal with a duty cycle of 1-D is supplied to switches S2, S4, S7 and S9 to control these switches to be in the opposite state, for instance turned off. During a successive second time phase $\Phi 2$, the states of all the switches can be reversed.

To configure the first SCC stage 202 for operation as a 4:1 voltage divider, the switching clock signal with a duty cycle D that is output from the DCO 106 is supplied to switches S3, S5, S6 and S8 to control these switches to be in a given state during a first time phase $\Phi 1$, for instance turned on, and a clock signal with a duty cycle of 1-D is supplied to switches S1, S2, S4, S7 and S9 to control these switches to be in the opposite state, for instance turned off. During a successive second time phase $\Phi 2$, the states of all the switches can be reversed.

It will be apparent that the difference between the first SCC stage 202 operating as a 5:1 voltage divider or a 4:1 voltage divider is dependent on the time phase of the switching clock signal during which the switch S1 is turned on. As shown in FIG. 2, the first bit (bit 1) of the digital output code output from the FSM 108 is used to control whether the switch S1 is turned on (closed) during the first time phase $\Phi 1$ or the second time phase $\Phi 2$ of the switching clock signal, thus controlling whether the the first SCC stage 202 operates as a 5:1 voltage divider or a 4:1 voltage divider.

The duty cycle of the switching clock signal that is output from the DCO 106 may be set as 50%. To prevent the current shoot-through during the switches transmit state from turn-on to turn-off, dead-time is added. The dead-time of a SCC stage refers to the time period during a switching transition when the first set of switches and the second set of switches are both are open. So, the actual duty cycle may be configured to be a little less than 50%, e.g. 49%. The dead-time may be added by a dead-time generator which generates two phase complimentary non-overlapping clock signals.

By implementing the first SCC stage 202 as a 4:1/5:1 voltage divider the number of switches and capacitors are reduced compared to a 2-stage 2:1 voltage divider whilst obtaining the same resolution, thereby enhancing area efficiency.

Figure 4:
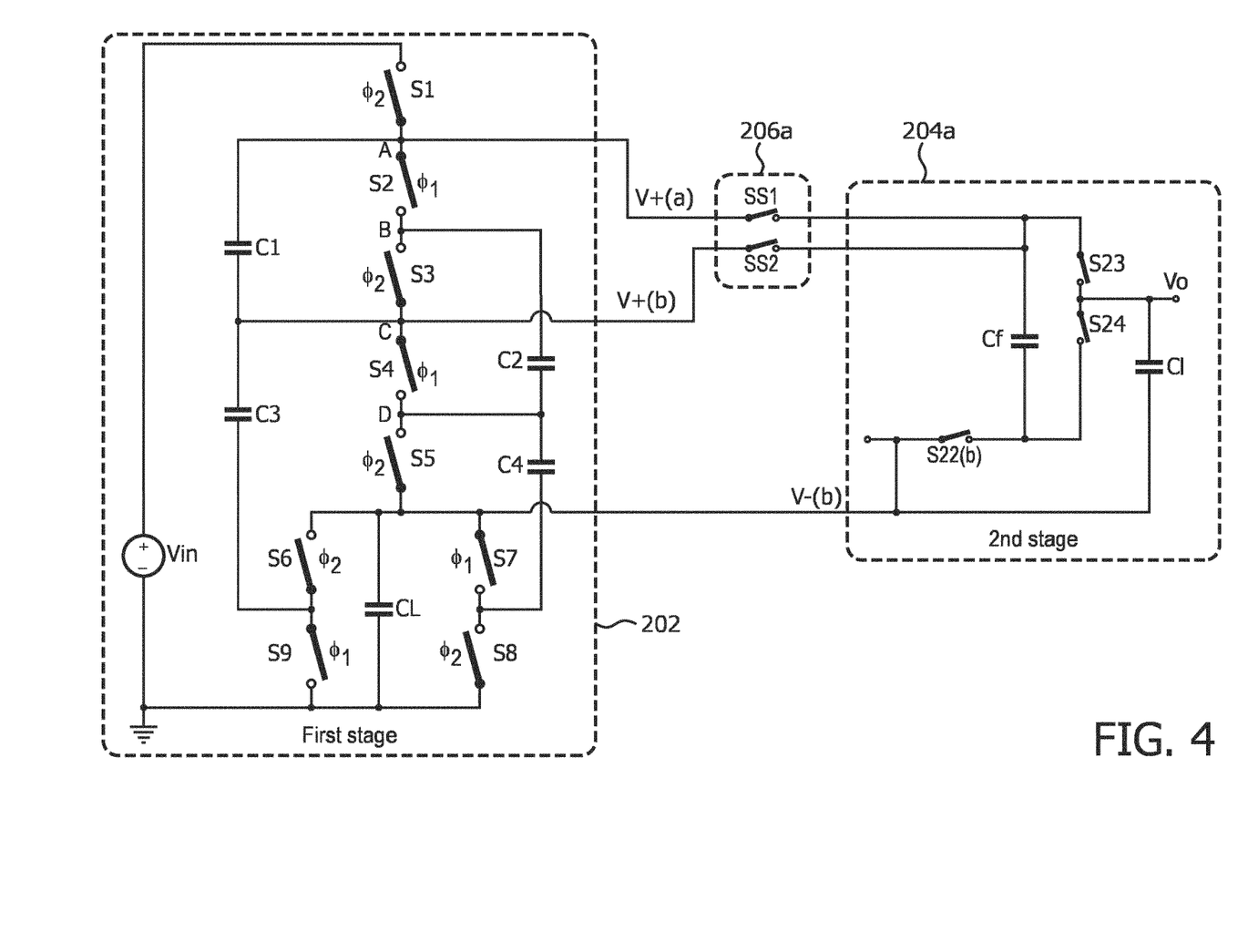
FIG. 4 illustrates a 2:1 voltage divider circuit coupled to the first switched capacitor converter stage.

FIG. 4 illustrates the connections between the first SCC stage 202 and the second stabilizer SCC stage 204a.

A selection switch block 206a (also shown in FIG. 2) is coupled between the first SCC stage 202 and the second stabilizer SCC stage 204a. A first selection switch SS1 of the selection switch block 206a is coupled between node A of the first SCC stage 202 and a higher voltage input V+ of the second stabilizer SCC stage 204a. A second selection switch SS2 of the selection switch block 206a is coupled between node C of the first SCC stage 202 and the higher voltage input V+ of the second stabilizer SCC stage 204a. A lower voltage input V− of the second stabilizer SCC stage 204a is coupled to the fifth central node 3015 of the first SCC stage 202.

The second stabilizer SCC stage 204a operates in two phases. In a first time phase Φ1, the top plate of the flying capacitor Cf is connected to the higher voltage input V+ terminal of the second stabilizer SCC stage 204a and the bottom plate of the flying capacitor Cf is connected to Vo (output voltage of the second stabilizer SCC stage 204a) due to switch S24 being turned on (whilst switches S22(b) and S23 are turned off). In a second time phase Φ2, the top plate of the flying capacitor Cf is connected to Vo (due to switch S23 being turned on) and the bottom plate of the flying capacitor Cf is connected to the lower voltage input V− of the second stabilizer SCC stage 204a due to switch S22(b) being turned on (whilst switch S24 is turned off). The top plate of a loading capacitor Cl is connected to Vo, whilst the bottom plate of the loading capacitor Cl is connected to the lower voltage input V− of the second stabilizer SCC stage 204a It will be apparent that the loading capacitor shares the charge with the flying capacitor Cf. The output voltage will therefore be at half the input voltage (the midpoint between the voltage on the higher voltage input V+ of the second stabilizer SCC stage 204a and the voltage on the lower voltage input V− of the second stabilizer SCC stage 204a) when the loading is zero. When at rated loading, the output voltage Vo of the second stabilizer SCC stage 204a drops because of finite output resistance. Fortunately after regulation by the feedback controller 104, the desired output voltage can be reached.

When operating as a 5:1 voltage divider the first SCC stage 202 provides the voltage 1/5Vin to the lower voltage input V− of the second stabilizer SCC stage 204a. When operating as a 4:1 voltage divider the first SCC stage 202 provides the voltage 1/4Vin to the lower voltage input V− of the second stabilizer SCC stage 204a.

The inventors have realized that in each output point of a previous SCC stage, in fact, two conversion ratios are provided at different half-cycles. When operating as a 5:1 voltage divider, the following output node voltages of the first SCC stage 202 can be found:

Node A: 4/5 Vin (Φ1) and Vin (Φ2)
Node B: 4/5 Vin (Φ1) and 3/5 Vin (Φ2)
Node C: 2/5 Vin (Φ1) and 3/5 Vin (Φ2)
Node D: 2/5 Vin (Φ1) and 1/5 Vin (Φ2)

Figure 5:
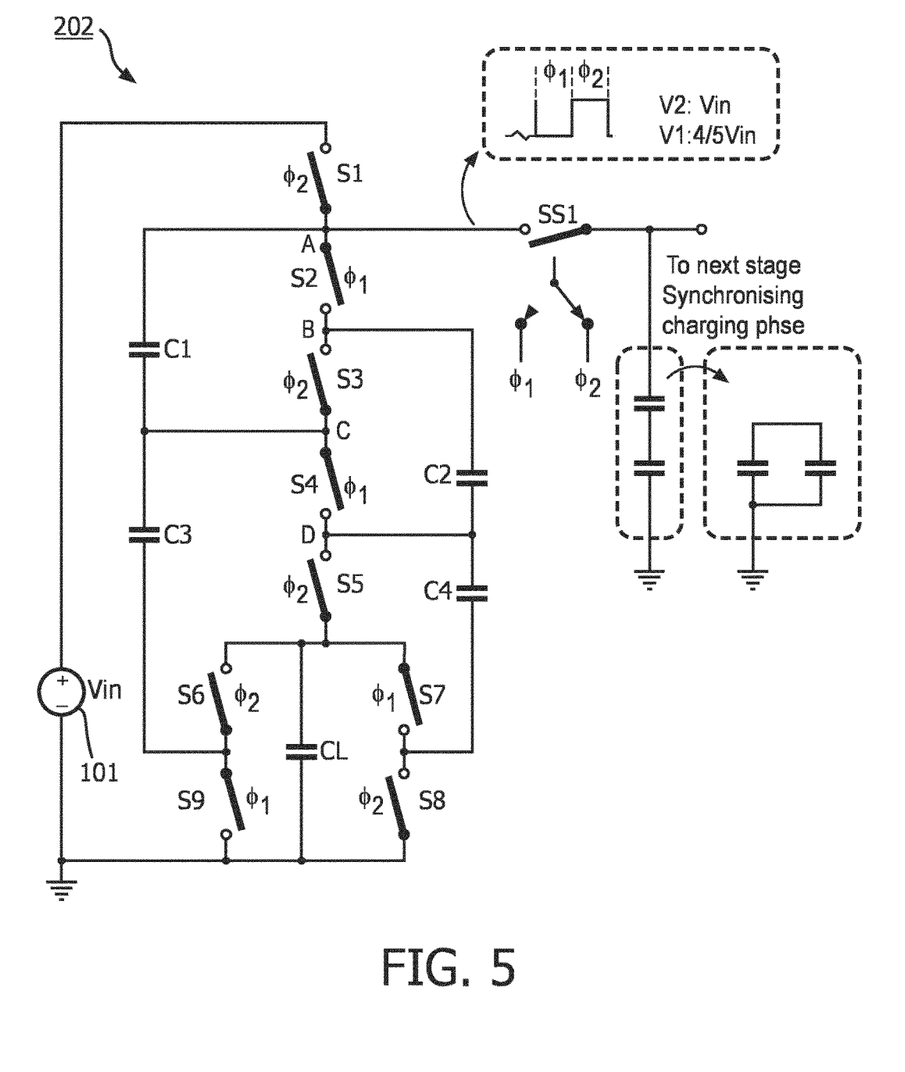
FIG. 5 illustrates the operating principle of a voltage synchronizing technique.

FIG. 5 shows the first SCC stage 202. Taking node A as an illustration, when the Dickson ladder works, the voltage of node A could output two possible voltage levels. One of these output voltage levels is V1: 4/5Vin when the switching clock signal that is output from the DCO 106 is in the first time phase Φ1 and another is V2:Vin, when the switching clock signal that is output from the DCO 106 is in the second time phase Φ2.

The following cascaded SCC (the second SCC stage 204a in this example) has two operating phases, a charging phase and an output phase. The only phase when the 2:1 voltage divider gets energy output from the previous stage (the first SCC stage 202 in this example) is the charging phase, which means the output phase is independent of previous output voltage.

Thus the following cascaded SCC (the second SCC stage 204a in this example) needs to charge at the first half-cycle and discharge at the second half-cycle. In the first half-cycle, charging depends on the output of the previous SCC (the first SCC stage 202 in this example), while in the second half-cycle, discharge is irrelevant to the output of the previous SCC (the first SCC stage 202 in this example).

Based on the above realization, embodiments of the present disclosure relate to the use of selection switches that are time-controlled to selectively synchronize the charging half-cycle of the following SCC with a desired one of the two half-cycles of the previous SCC, wherein the two half-cycles of the previous SCC respectively provide a stable and different conversion ratio.

By controlling the selections switches SS1 and SS2, the voltage domain of the second stabilizer SCC stage 204a can be varied by varying the voltage on the higher voltage input V+ of the second stabilizer SCC stage 204a.

As shown in FIG. 5, a control signal is supplied to the selection switch SS1 of the selection switch block 206a. The control signal supplied to the selection switch SS1 which corresponds to the second bit (bit 2) of the digital output code output from the FSM 108 is synchronised to the switching clock signal output from the DCO 106. Thus the control signal supplied to the selection switch SS1 is able to control the selection switch SS1 to turn on during the first time phase Φ1 or to turn on during the second time phase Φ2.

If during the first time phase Φ1 the selection switch SS1 is turned on and the selection switch SS2 is turned off (the voltage 4/5Vin output from node A of the first SCC stage 202 is supplied to the higher voltage input V+ of the second stabilizer SCC stage 204a) and during the second time phase Φ2 the selection switch SS1 and the selection switch SS2 are both turned off, the voltage domain of the second stabilizer SCC stage 204a will be between 1/5Vin and 4/5Vin, therefore the output voltage Vo of the second stabilizer SCC stage 204a will be 2.5/5Vin. This is illustrated in column "STB 2nd" of FIG. 8(c).

If during the first time phase Φ1 the selection switch SS1 and the selection switch SS2 are both turned off, and during the second time phase Φ2 the selection switch SS1 is turned on and the selection switch SS2 is turned off (the voltage Vin output from node A of the first SCC stage 202 is supplied to the higher voltage input V+ of the second stabilizer SCC stage 204a), the voltage domain of the second stabilizer SCC stage 204a will be between 1/5Vin and Vin, therefore the output voltage Vo of the second stabilizer SCC stage 204a will be 3/5Vin. This is illustrated in column "STB 2nd" of FIG. 8(d).

Although not shown in FIG. 5, a control signal is also supplied to the selection switch SS2 of the selection switch block 206a. The control signal supplied to the selection switch SS2 which corresponds to the third bit (bit 3) of the digital output code output from the FSM 108 is synchronised to the switching clock signal output from the DCO 106. Thus the control signal supplied to the selection switch SS2 is able to control the selection switch SS2 to turn on during the first time phase Φ1 or to turn on during the second time phase Φ2.

If during the first time phase Φ1 the selection switch SS1 is turned off and the selection switch SS2 is turned on (the voltage 2/5Vin output from node C of the first SCC stage 202 is supplied to the higher voltage input V+ of the second stabilizer SCC stage 204a) and during the second time phase Φ2 the selection switch SS1 and the selection switch SS2 are both turned off, the voltage domain of the second stabilizer SCC stage 204a will be between 1/5Vin and 2/5Vin, therefore the output voltage Vo of the second stabilizer SCC stage 204a will be 1.5/5Vin. This is illustrated in column "STB 2nd" of FIG. 8(a).

If during the first time phase Φ1 the selection switch SS1 and the selection switch SS2 are both turned off, and during the second time phase Φ2 the selection switch SS2 is turned on and the selection switch SS1 is turned off (the voltage 3/5Vin output from node C of the first SCC stage 202 is supplied to the higher voltage input V+ of the second stabilizer SCC stage 204a), the voltage domain of the second stabilizer SCC stage 204a will be between 1/5Vin and 3/5Vin, therefore the output voltage Vo of the second stabilizer SCC stage 204a will be 2/5Vin. This is illustrated in column "STB 2nd" of FIG. 8(b).

From the above it will apparent that two different voltages (to be supplied to the higher voltage input V+ of the second stabilizer SCC stage 204a) can be chosen by only one selection switch, just by changing its control signal.

Figure 6:
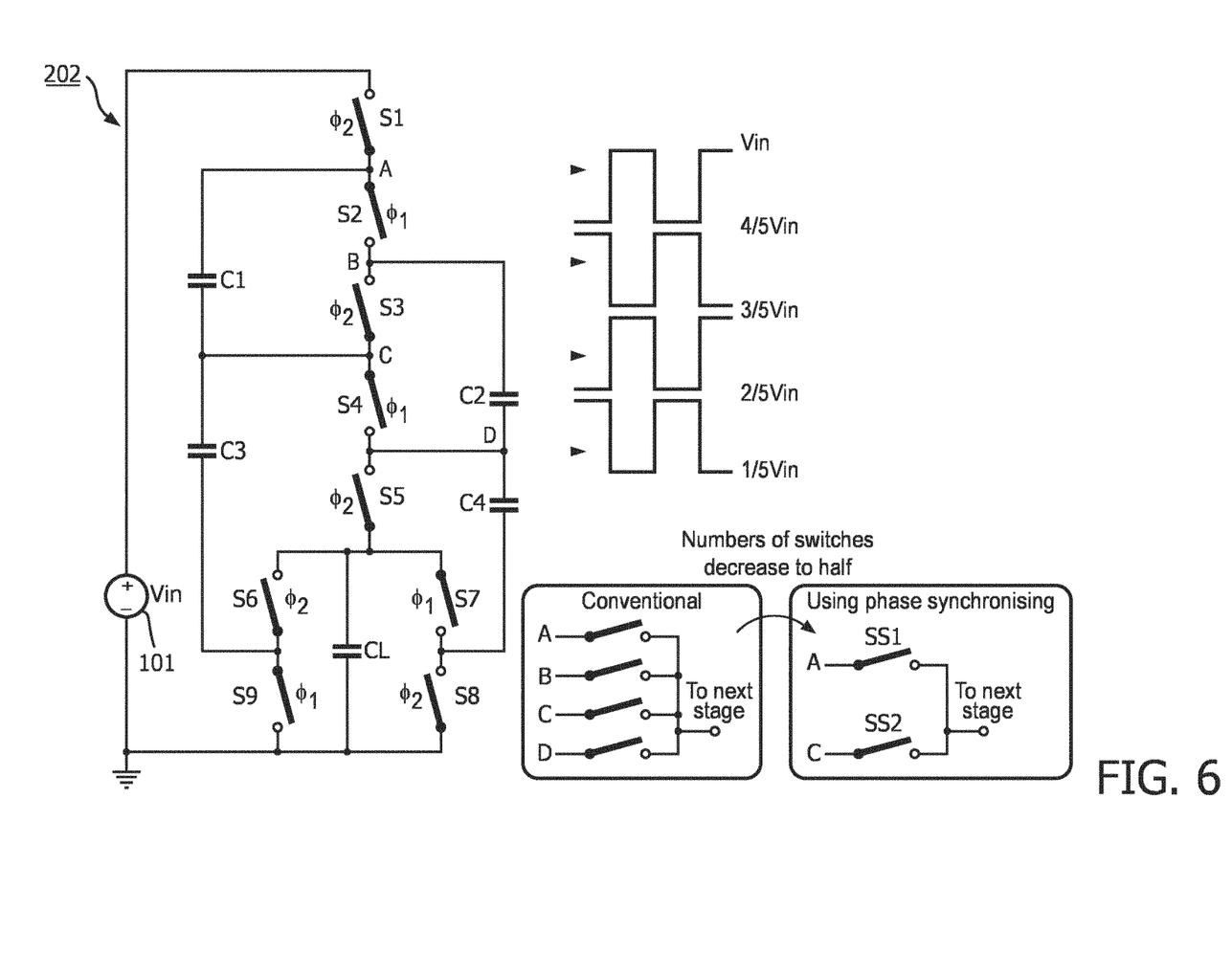
FIG. 6 illustrates switch reduction by the voltage synchronizing technique.
Figure 7:
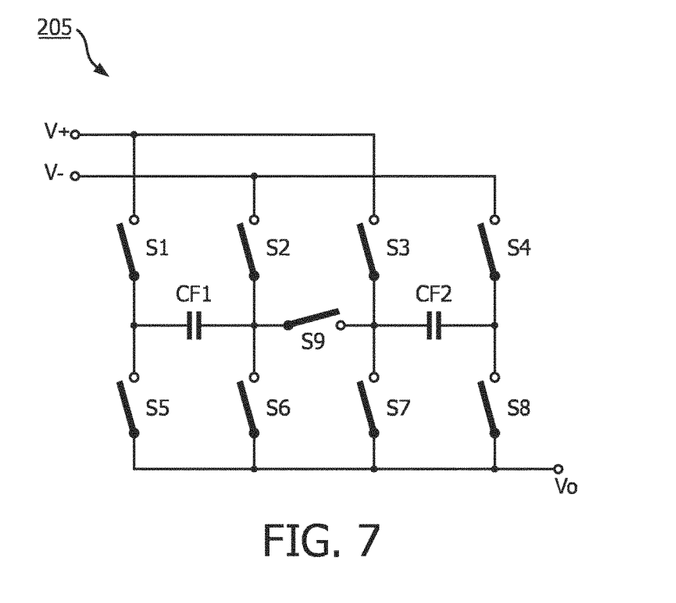
FIG. 7 illustrates a triple conversion ratio circuit used in a final fifth stage of the power chain.

This voltage synchronous technique described above advantageously reduces the number of required selection switches between the first SCC stage 202 and the second stabilizer SCC stage 204a by half, compared with conventional methods; this is illustrated in FIG. 6.

Referring back to the output node voltages of the first SCC stage 202 when operating as a 5:1 voltage divider, the conventional method to obtain voltages 4/5Vin, 3/5Vin, 2/5Vin and 1/5Vin from the first SCC stage 202 is to use four selection switches connected to output nodes A, B, C and D, respectively. After using the voltage synchronous technique described above, only node A and node C are necessary to connect to selection switches SS1 and SS2 respectively. This is because each of node A and node C can output two voltages, which are able to cover the desired voltage range. Thus the number of selection switches required decreases by half to two (selection switch SS1 connected to node A and selection switch SS2 connected to node C).

Whilst the voltage synchronous technique between the first SCC stage 202 and the second stabilizer SCC stage 204a has been described above with reference to the first SCC stage 202 operating as a 5:1 voltage divider, the same principles apply when the first SCC stage 202 operates as a 4:1 voltage divider. Furthermore whilst the voltage synchronous technique has been described above with reference to the first SCC stage 202 and the second stabilizer SCC stage 204a the same principles are also applied to the later SCC stages shown in FIG. 2. That is, the charging half-cycle of each SCC stage is synchronised to a desired one of the two half-cycles of the previous SCC stage, wherein the two half-cycles of the previous SCC respectively provide a stable and different conversion ratio. Thus the number of required selection switches between the respective SCC stages is reduced by half compared with conventional methods.

Whilst the voltage domain of the second stabilizer SCC stage 204a is varied by varying only the voltage on the higher voltage input V+ of the second stabilizer SCC stage 204a, for the later stages (third SCC stage 204b, fourth SCC stage 204c, and final fifth SCC stage 205) the voltage domain for these stages may be varied by varying both the voltage on the higher voltage input V+ and the voltage on the lower voltage input V− of the respective stage. As will be described below, selections switches are used to control the voltage domain for these stages. These selection switches are controlled by control signals which correspond to the digital output code output from the FSM 108.

Referring back to FIG. 2, a selection switch block 206b is used to control the voltage that is supplied to the higher voltage input V+ of the third SCC stage 204b. Selection switch SS3 of the selection switch block 206b is coupled between node C of the first SCC stage 202 and the higher voltage input V+ of the third SCC stage 204b. Selection switch SS4 of the selection switch block 206b is coupled between the output of the second stabilizer SCC stage 204a and the higher voltage input V+ of the third SCC stage 204b.

A selection switch block 206c is used to control the voltage that is supplied to the lower voltage input V− of the third SCC stage 204b. Selection switch SS5 of the selection switch block 206c is coupled between node C of the first SCC stage 202 and the lower voltage input V− of the third SCC stage 204b. Selection switch SS6 of the selection switch block 206c is coupled between the output of the second stabilizer SCC stage 204a and the lower voltage input V− of the third SCC stage 204b. Selection switch SS7 of the selection switch block 206c is coupled between node the fifth central node 3015 of the first SCC stage 202 and the lower voltage input V− of the third SCC stage 204b.

With reference to the first SCC stage 202 operating as a 5:1 voltage divider, in operation, the following voltage domains for the third SCC stage 204b may be created.

A voltage domain between 1/5Vin (at the lower voltage input V− of the third SCC stage 204b) and the output voltage of the second stabilizer SCC stage 204a (at the higher voltage input V+ of the third SCC stage 204b) can be selected by turning on both selection switches SS4 and SS7. A voltage domain between the output voltage of the second stabilizer SCC stage 204a (at the lower voltage input V− of the third SCC stage 204b) and 2/5Vin (at the higher voltage input V+ of the third SCC stage 204b) can be selected by turning on both selection switches SS6 and SS3 (during the first time phase Φ1). The possible voltages output from the third SCC stage 204b (at the lower voltage input V−, output voltage and at the higher voltage input V+ of the third SCC stage 204b) are illustrated in column "3rd" of FIG. 8(a).

A voltage domain between 2/5Vin (at the lower voltage input V− of the third SCC stage 204b) and the output voltage of the second stabilizer SCC stage 204a (at the higher voltage input V+ of the third SCC stage 204b) can be selected by turning on both selection switches SS5 (during the first time phase Φ1) and SS4. A voltage domain between the output voltage of the second stabilizer SCC stage 204a (at the lower voltage input V− of the third SCC stage 204b) and 3/5Vin (at the higher voltage input V+ of the third SCC stage 204b) can be selected by turning on both selection switches SS6 and SS3 (during the second time phase Φ2). The possible voltages output from the third SCC stage 204b (at the lower voltage input V−, output voltage and at the higher voltage input V+ of the third SCC stage 204b) are illustrated in column "3rd" of FIG. 8(c).

As described above four voltage domains are provided by the second stabilizer SCC stage 204a, so two digital bits are needed to control selections switches SS3-SS7 as will be apparent to those skilled in the art. A fourth and fifth bit (bits 4 and 5) of the digital output code output from the FSM 108 are used to control the selection switches of the selection switch block 206b and the selection switch block 206c.

Selection switch blocks 206d and 206e control the voltage domain for the fourth SCC stage 204c. Selection switch block 206d comprises selection switches SS8 and SS9. Selection switch block 206e comprises selection switches SS10 and SS11.

Selection switches SS8 and SS11 work in pair (both are turned on/off are turned on/off at the same time) and so do SS9 and SS10. If selection switches SS8 and SS11 are turned on, the voltage domain for the fourth SCC stage 204c is between the high voltage input V+ of the third SCC stage 204b and the output voltage of the third SCC stage 204b. If selection switches SS9 and SS10 are turned on, the voltage domain for the fourth SCC stage 204c is between the output voltage of the third SCC stage 204b and the low voltage input V− of the third SCC stage 204b. A sixth bit (bit 6) of the digital output code output from the FSM 108 is used to control the selection switches of the selection switch block 206d and the selection switch block 206e. A single bit of the digital output code output from the FSM 108 is sufficient to control the selection switches of the selection switch block 206d and the selection switch block 206e because when the selection switches SS8 and SS11 are turned on, selection switches SS9 and SS10 must be turned off and vice versa. An inverter (not shown in FIG. 2) is the simplest way to implement this at the circuit level.

Selection switch blocks 206f and 206g control the voltage domain for the final fifth SCC stage 205. Selection switch block 206f comprises selection switches SS12 and SS13. Selection switch block 206g comprises selection switches SS14 and SS15.

Selection switches SS12 and SS15 work in pair (both are turned on/off are turned on/off at the same time) and so do SS13 and SS14. If selection switches SS12 and SS15 are turned on, the voltage domain for the final fifth SCC stage 205 is between the high voltage input V+ of the fourth SCC stage 204c and the output voltage of the fourth SCC stage 204c. If selection switches SS13 and SS14 are turned on, the voltage domain for the final fifth SCC stage 205 is between the output voltage of the fourth SCC stage 204c and the low voltage input V− of the fourth SCC stage 204c. A seventh bit (bit 7) of the digital output code output from the FSM 108 is used to control the selection switches of the selection switch block 206f and the selection switch block 206g. A single bit of the digital output code output from the FSM 108 is sufficient to control the selection switches of the selection switch block 206f and the selection switch block 206g because when the selection switches SS12 and SS15 are turned on, selection switches SS13 and SS14 must be turned off and vice versa. An inverter (not shown in FIG. 2) is the simplest way to implement this at the circuit level.

FIG. 5 illustrates the final fifth SCC stage 205 which comprises nine switches S1-S9 and two flying capacitors CF1 and CF2. By applying appropriate switching sequence to the switches S1-S9, this stage is able to operate at three modes, i.e. operating as a 3:1 voltage divider, a 2:1 voltage divider, or a 3:2 voltage divider. In comparison with a single-stage 2:1 voltage divider, this triple conversion ratio stage has higher voltage choices, thereby holds higher voltage resolution.

To operate as a 3:1 voltage divider, switches S1, S9 and S8 will turn on in the first time phase Φ1 (capacitor Cf1 and Cf2 are in series connection between V+ and Vo), and switches S2, S5, S4 and S7 will turn on in the second time phase Φ2 (capacitor Cf1 and Cf2 are in parallel between V− and Vo).

To operate as a 2:1 voltage divider, switches S1, S6, S3 and S8 will turn on in the first time phase Φ1 (capacitors Cf1 and Cf2 are in parallel between V+ and Vo), and switches S2, S5, S4 and S7 will turn on in the second time phase Φ2 (capacitors Cf1 and Cf2 are in parallel between V− and Vo).

To operate as a 3:2 voltage divider, switches S1, S6, S2 and S8 will turn on in the first time phase Φ1 (capacitors Cf1 and Cf2 are in parallel between V+ and Vo), and switches S4, S9 and S5 will turn on in the second time phase Φ2 (capacitors Cf1 and Cf2 are in series between V− and Vo).

Selection switch block 206h comprises selection switches SS16 and. Selection switch SS16 is coupled between the high voltage input V+ of the final fifth SCC stage 205 and the output of the switched capacitor power chain 102. Selection switch SS17 is coupled between the output voltage of the final fifth SCC stage 205 and the output of the switched capacitor power chain 102.

An eighth bit (bit 8) of the digital output code output from the FSM 108 is used to control the selection switches of the selection switch block 206h. A single bit is sufficient to control the selection switches of the selection switch block 206d as explained below. Supposing two voltage domain VD1 and VD2 are provided by the final fifth SCC stage 205 and these voltage domain are continuous (meaning that the lowest voltage of VD1 is equal to the highest voltage of VD2). If the lowest voltage of VD1 is desired the voltage domain of the final fifth SCC stage 205 can be adjusted to VD2 and selection switch SS16 used to select the highest voltage of VD2 (this voltage is the same as the lowest voltage of VD1). Thus only two selection switches in the selection switch block 206h are used to select the output voltage. When selection switch SS16 is turned on, SS17 is turned off and vice versa. An inverter (not shown in FIG. 2) is the simplest way to implement this at the circuit level. Should the lowest voltage of VD1 be required to be selectable, then an additional selection switch coupled between the low voltage input V− of the final fifth SCC stage 205 and the output of the switched capacitor power chain 102 is required (and an additional bit of the digital output code output from the FSM 108 will be required to control the selection switch block 206h).

As described above, during each stage of the switched capacitor power chain 102 several configurable switches are used to adjust the connection of voltage nodes in the respective stage. Each individual setting of switches in the switched capacitor power chain 102 corresponds to one conversion ratio. Therefore, by setting the stages of switches one by one, or adjacent stage, the continuous output voltage can be achieved. Although, output voltage is controlled not smoothly continuous, or is pseudo continuous, however, the steps can be accurately constrained in a small range.

In FIG. 8, the operating mechanism is illustrated with reference to the first SCC stage 202 operating as a 5:1 voltage divider. One concept should be noted in that to achieve a stable output voltage, a stable reference node is necessary. Therefore, the second SCC stage 204a is involved to be used as a stabilizer, providing a scaled down voltage.

FIG. 8 illustrates the possible voltages output from each stage (at the lower voltage input V−, output voltage and at the higher voltage input V+ of each stage). In FIG. 8, a solid line represents a stable voltage, whilst dotted line represents an unstable voltage. Meanwhile, the shaded region represents the region which is able to be regulated. The operation mechanism can be divided into four operating modes which are shown in FIGS. 8(a), (b), (c) and (d), respectively.

The first SCC stage 202 (5:1 voltage divider and 4:1 voltage divider) divides the input voltage into 5 regions, e.g. 5Vin to 4Vin, 4Vin to 3Vin, 3Vin to 2Vin, 2Vin to 1Vin and 1Vin to ground.

Figure 8A:
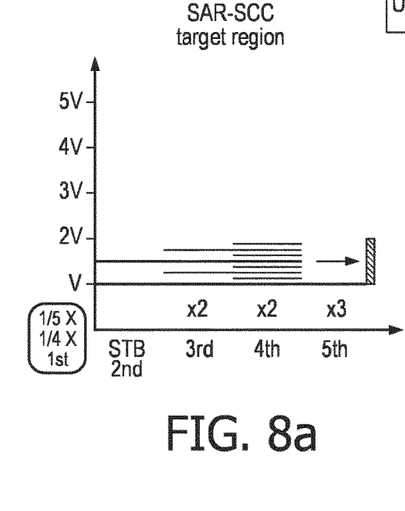
FIGS. 8a-d illustrates the operating mechanism of the switched capacitor power chain in four operating modes.
Figure 8B:
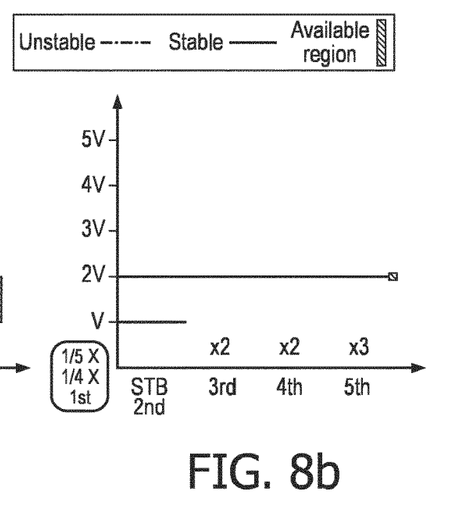
Figure 8C:
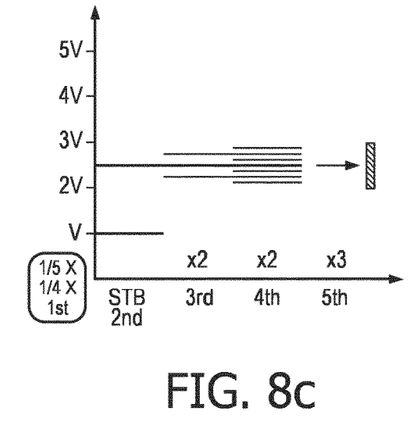
Figure 8D:
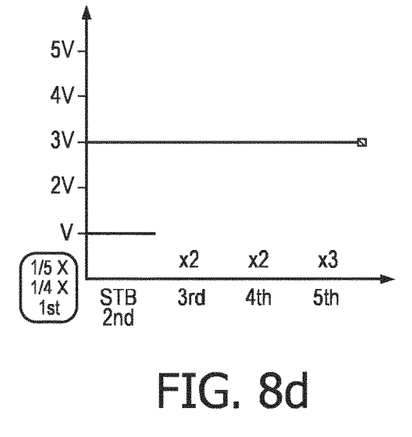

First, as shown in FIG. 8(a), the second stabilizer SCC stage 204a is connected between 2Vin and 1Vin, providing a stable voltage 1.5Vin for the following stages. Consequently, the output voltage can be from Vin to 2Vin in small steps. Similarly, when the second stabilizer SCC stage 204a is connected between 2Vin to 3Vin, which is shown in FIG. 8(c), the region of output voltage is from 2Vin to 3Vin. It can be noticed that in the aforementioned conditions, the voltage 2Vin and 3Vin are unstable (drawn in dotted line). Thus, to achieve a stable voltage of 2Vin and 3Vin, the modes shown FIGS. 8(b) and (d) are provided, in which the second stabilizer SCC stage 204a provides voltage directly to the output. Taking these four operating modes together, the output voltage from Vin to 3Vin can be accurately regulated.

For the first SCC stage 202, assume input voltage is Vin, then, if operating as a 5:1 voltage divider the stage can provide Vin, 4/5Vin, 3/5Vin, 2/5Vin and 1/5Vin voltages. If operating as a 4:1 voltage divider, the possible voltages are 5/4Vin, VDD, 3/4Vin, 2/4Vin, and 1/4Vin. For each case, referring to FIG. 8, there are eight possible voltage domains before the final fifth SCC stage 205 shown in the "$4^{th}$" column in FIG. 8(a)) and eight possible voltage domains before the final fifth SCC stage 205 shown in the "$4^{th}$" column in FIG. 8(c), therefore sixteen in total. Notice that the case of 3/5Vin, 2/5Vin have been covered in FIG. 8(b) and FIG. 8(d). For the final fifth SCC stage 205, it is 3-ratio reconfigurable. Thus, (8+8)*3=48 conversion ratios are counted when first SCC stage 202 operates as a 5:1 voltage divider. Similarly when first SCC stage 202 operates as a 4:1 voltage divider, the number of conversion ratios are also 48. Thus, the switched capacitor power chain 102 provides 96 switchable conversion ratios, $M_0$ to $M_{96}$. Therefore, by switch adjacent ratios e.g. $M_N$ and $M_{N+1}$, output voltage can be regulated within very small voltage ripple. All of these possible conversion ratios are configured by the digital codes output from the FSM 108 of the controller 104.

In accordance with the embodiments described above, the switched capacitor converter power chain 102 provides good line regulation, as well as high efficiency. The switched capacitor converter power chain 102 can provide numerous conversion ratios to adapt to the input voltage. So, with multiple pseudo-continuous steps, good line regulation and output accuracy are achieved. Meanwhile, as the real voltage is closely near ideal voltage, efficiency drop by regulation is largely reduced.

As the topology of the switched capacitor converter power chain 102 is completely capacitive, it is high possible to be fully integrated on a single chip, which means it is flexible and will be low cost. Those features extend it into diverse applications, for instance, driver-on-board LED driver, SoC power supply, remote sensor network, energy harvesting, etc.

Whilst embodiments of the present disclosure have been described above with reference to the switched capacitor converter power chain 102 comprising five stages, this is merely an example and the voltage synchronizing technique can be applied to a switched capacitor converter power chain 102 comprising one or more voltage divider stages following the first SCC stage 202.

All the switches used in the stages of the switched capacitor converter power chain 102 can be bi-directional and implemented in a suitable technology that is compatible with the switching frequency of the circuit. For instance the switches can be formed by Metal Oxide Semiconductor Field Effect Transistors (MOSFET) on a silicon substrate or High Electron Mobility Transistors (HEMT) on a Gallium-Nitride substrate.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:
a switched capacitor circuit comprising a plurality of voltage divider circuit stages including a first voltage divider circuit stage coupled to a second voltage divider circuit stage; and
a controller configured to supply a clock signal to the first voltage divider circuit stage to provide a first voltage on an output node of the first voltage divider circuit stage during a first half cycle of the clock signal, and a second voltage on said output node during a second half cycle of the clock signal; and
at least one selection switch connected between said output node and an input node of the second voltage divider stage;
wherein the second voltage divider circuit stage is configured to charge to an input voltage during a half cycle of the clock signal, and the controller is configured to synchronize charging of the second voltage divider circuit stage to a selected one of (i) the first half cycle of the clock signal by turning on said at least one selection switch in said first half cycle, wherein the first voltage is supplied as said input voltage, and (ii) the second half cycle of the clock signal, wherein the second voltage is supplied as said input voltage, wherein the second voltage divider circuit stage provides an output voltage, wherein the output voltage is lower than the input voltage.

2. The system according to claim 1, wherein the controller is configured to synchronize charging of the second voltage divider circuit to the second half cycle of the clock signal by turning on said at least one selection switch during the second half cycle of the clock signal, to supply the second voltage on said input node.

3. The system according to claim 1, wherein the controller is configured to detect an output parameter and based on the detected output parameter and a target output voltage, determine a conversion ratio of the switched capacitor circuit and make said selection to configure the switched capacitor circuit to provide said determined conversion ratio.

4. The system according to claim 3, wherein the output parameter is an output voltage of the switched capacitor circuit.

5. The system according to claim 3, further comprising at least one light source (D) wherein the switched capacitor circuit provides an output voltage that drives said at least one light source, and the output parameter is a sense voltage across a sensing resistor indicative of current flowing through said at least one light source.

6. The system according to claim 1, wherein the first voltage divider circuit stage is based on a Dickson ladder topology and is configured to operate as either a divide-by-5 voltage divider or a divide-by-4 voltage divider.

7. The system according to claim 6, wherein the first voltage divider circuit stage comprises a plurality of switches, and the controller is configured to control the first voltage divider circuit stage to operate as divide-by-5 voltage divider by supplying said clock signal to turn on a first set of said plurality of switches on during the first half cycle of the clock signal and a second set of said plurality of switches during the second half cycle of the clock signal.

8. The system according to claim 7, wherein the controller is configured to control the first voltage divider circuit stage to operate as divide-by-4 voltage divider by supplying said clock signal to turn on a third set of said plurality of switches on during the first half cycle of the clock signal and a fourth set of said plurality of switches during the second half cycle of the clock signal.

9. The system according to claim 1, wherein the first voltage divider circuit stage is a divide-by-two voltage divider.

10. The system according to claim 6, wherein the second voltage divider circuit stage is a divide-by-two voltage divider.

11. The system according to claim 6, wherein the second voltage divider circuit stage is configured to operate as either (i) a divide-by-2 voltage divider (ii) a divide-by-3 voltage divider, or a (iii) divide-by-1.5 voltage divider.

12. The system according to claim 11, wherein the second voltage divider circuit stage comprises a plurality of switches, and the controller is configured to:
control the second voltage divider circuit stage to operate as a divide-by-2 voltage divider by supplying said clock signal to turn on a first set of said plurality of switches on during the first half cycle of the clock signal and a second set of said plurality of switches during the second half cycle of the clock signal;
control the second voltage divider circuit stage to operate as a divide-by-3 voltage divider by supplying said clock signal to turn on a third set of said plurality of switches on during the first half cycle of the clock signal and a fourth set of said plurality of switches during the second half cycle of the clock signal; and
control the second voltage divider circuit stage to operate as a divide-by-1.5 voltage divider by supplying said clock signal to turn on a fifth set of said plurality of switches on during the first half cycle of the clock signal and a sixth set of said plurality of switches during the second half cycle of the clock signal.

13. The system according to claim 1, further comprising:
a light module comprising at least one light source wherein the switched capacitor circuit provides an output voltage that drives said at least one light source.

14. The system according to claim 1, further comprising a second at least one selection switch connected between a second output node of the first voltage divider and the input node of the second voltage divider,
wherein the controller is further configured to supply the clock signal to the first voltage divider circuit stage to provide a third voltage on a second output node of the first voltage divider circuit stage during the first half cycle of the clock signal, and a third voltage on said second output node during the second half cycle of the clock signal, wherein the third voltage is lower than the first voltage, and the fourth voltage is lower than the second voltage,
wherein the controller is further configured to synchronize the charging of the second voltage divider stage to a selected one of (iii) the first half cycle of the clock signal by turning on said second at least one selection switch in said first half cycle, wherein the third voltage is supplied as said input voltage, and (iv) the second half cycle of the clock signal, wherein the fourth voltage is supplied as said input voltage.

15. The system according to claim 14, wherein the controller is configured to synchronize charging of the second voltage divider circuit to the second half cycle of the clock signal by turning on said second at least one selection switch during the second half cycle of the clock signal, to supply the fourth voltage on said input node.

16. The system according to claim 15, wherein the controller is configured to detect an output parameter and based on the detected output parameter and a target output voltage, determine a conversion ratio of the switched capacitor circuit and make said selection to configure the switched capacitor circuit to provide said determined conversion ratio.

17. The system according to claim 16, wherein the output parameter is an output voltage of the switched capacitor circuit.

18. The system according to claim 17, further comprising at least one light source wherein the switched capacitor circuit provides an output voltage that drives said at least one light source, and the output parameter is a sense voltage across a sensing resistor indicative of current flowing through said at least one light source.

19. A system comprising:
a first voltage divider circuit stage; and
a controller configured to supply a clock signal to the first voltage divider circuit stage to provide a first voltage on an output node of the first voltage divider circuit stage during a first half cycle of the clock signal, and a second voltage on said output node during a second half cycle of the clock signal;
wherein the first voltage divider circuit stage is configured to operate as either a divide-by-5 voltage divider or a divide-by-4 voltage divider,
wherein the first voltage divider circuit stage comprises a plurality of switches, and the controller is configured to control the first voltage divider circuit stage to operate as divide-by-5 voltage divider by supplying said clock signal to turn on a first set of said plurality of switches on during the first half cycle of the dock signal and a second set of said plurality of switches during the second half cycle of the clock signal,
wherein the controller is configured to control the first voltage divider circuit stage to operate as divide-by-4 voltage divider by supplying said clock signal to turn on a third set of said plurality of switches on during the first half cycle of the clock signal and a fourth set of said plurality of switches during the second half cycle of the clock signal.

20. A system comprising:
a voltage divider circuit stage configured to operate as either (i) a divide-by-2 voltage divider (ii) a divide-by-3 voltage divider, or a (iii) divide-by-1.5 voltage divider; and
a controller configured to:
control the voltage divider circuit stage to operate as a divide-by-2 voltage divider by supplying said clock signal to turn on a first set of said plurality of switches on during the first half cycle of the clock signal and a second set of said plurality of switches during the second half cycle of the clock signal;

control the voltage divider circuit stage to operate as a divide-by-3 voltage divider by supplying said clock signal to turn on a third set of said plurality of switches on during the first half cycle of the clock signal and a fourth set of said plurality of switches during the second half cycle of the clock signal; and control the voltage divider circuit stage to operate as a divide-by-1.5 voltage divider by supplying said clock signal to turn on a fifth set of said plurality of switches on during the first half cycle of the clock signal and a sixth set of said plurality of switches during the second half cycle of the clock signal.

* * * * *